US 6,592,657 B2

(12) United States Patent
Lee et al.

(10) Patent No.: US 6,592,657 B2
(45) Date of Patent: *Jul. 15, 2003

(54) ADDITIVES FOR INK-JET INKS

(75) Inventors: Shirley Lee, Poway, CA (US); Steven L. Webb, Murrieta, CA (US); Grant Allen Webster, Valley Center, CA (US); Christopher S. Tanner, San Diego, CA (US); Stephen W. Bauer, San Diego, CA (US); Keshava A. Prasad, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 09/916,482

(22) Filed: Jul. 27, 2001

(65) Prior Publication Data

US 2003/0047109 A1 Mar. 13, 2003

Related U.S. Application Data

(63) Continuation-in-part of application No. 09/847,069, filed on May 1, 2001, which is a continuation-in-part of application No. 09/781,776, filed on Feb. 12, 2001, now Pat. No. 6,533,851.

(51) Int. Cl.$^7$ ................................................. C09D 11/02
(52) U.S. Cl. ................................. 106/31.58; 106/31.43; 106/31.75; 106/31.86
(58) Field of Search ........................... 106/31.58, 31.43, 106/31.86, 31.75

(56) References Cited

U.S. PATENT DOCUMENTS

| | | | | |
|---|---|---|---|---|
| 4,259,675 A | * | 3/1981 | Mansukhani | 347/100 |
| 5,274,400 A | | 12/1993 | Johnson et al. | 106/31.58 |
| 5,434,606 A | | 7/1995 | Hindagolla et al. | 347/45 |
| 5,554,213 A | * | 9/1996 | Radigan et al. | 106/31.43 |
| 5,595,785 A | | 1/1997 | Hindagolla et al. | 427/271 |
| 5,656,655 A | | 8/1997 | Spada et al. | 514/415 |
| 5,755,032 A | | 5/1998 | Pan et al. | 347/47 |
| 5,786,830 A | | 7/1998 | Su et al. | 347/33 |
| 6,323,258 B1 | * | 11/2001 | Lin et al. | 523/161 |
| 2002/0185037 A1 | * | 12/2002 | Lee et al. | 106/31.58 |

FOREIGN PATENT DOCUMENTS

| | | |
|---|---|---|
| EP | 1090758 A2 | 4/2001 |
| GB | 2131445 | 6/1984 |
| JP | 01331393 | 8/1991 |

* cited by examiner

*Primary Examiner*—Helene Klemanski

(57) ABSTRACT

Ink-jet ink compositions are described comprising at least one organo-phosphonic acid or its sodium or potassium salt. The ink-jet ink compositions reduce puddling, scale formation, kogation and corrosion, and as such lead to improved print quality.

27 Claims, No Drawings

ADDITIVES FOR INK-JET INKS

The present application is a continuation-in-part of U.S. Ser. No. 09/847,069 filed May 1, 2001 which is in turn a continuation-in-part of U.S. Ser. No. 09/781,776 filed Feb. 12, 2001 now U.S. Pat. No. 6,533,851.

FIELD OF THE INVENTION

The present invention relates to ink compositions for ink-jet printing, and more particularly, to ink compositions that comprise organo-phosphonic acids and their salts.

BACKGROUND OF THE INVENTION

The ink-jet printing process involves the ejection of fine droplets of ink onto a print medium such as paper in response to electrical signals generated by a microprocessor. Typically, an ink-jet printer utilizes a pen set mounted on a carriage that is moved relative to the surface of a print medium. In commercially available ink-jet color printers, such as the DESKJET™ printer available from Hewlett-Packard Company. A typical pen includes print heads with orifice plates that have very small nozzles (10–50 μm diameter) through which the ink droplets are ejected. Adjacent to these nozzles are ink chambers where ink is stored prior to ejection. Ink drop ejection is currently achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink vapor that forces a drop of ink through the associated nozzle onto the print medium. A variety of complex interactions between the ink and pen structure (e.g. the resistor element, nozzle etc.) are known to affect both the short and long term reliability of pen performance and hence of print quality. Examples of these interactions include corrosion due to presence of metal ion impurities or other reactive components in the ink composition; kogation, defined as the build up of residue on the surface of resistor elements; puddling, defined as the formation of ink puddles on the orifice plates of the print head; and crusting, defined as the formation of insoluble crusts on the orifice plates of the print head.

High dot gain inks are desirable for ink jet printing because they give a large dot size for a given drop volume. The major advantage is that lower drop volumes can be used for a given printing application, resulting in lower cost per copy, reduced plain paper cockle and reduced amount of ink on transparency film. Most high dot gain inks have low surface tension, which causes the ink to spread across the orifice plates of the print head, to form so-called "puddling." The ink drops must fire through the puddles, which results in misdirected drops and streaking of images, and lowers print head reliability and results in poor print quality.

Several methods of addressing the puddling are known in the art, for example, use of surfactants to adjust the ink property (U.S. Pat. No. 5,656,655), improved orifice plate designs (U.S. Pat. Nos. 5,595,785 and 5,434,606), improved designs of ink channel geometry (U.S. Pat. Nos. 5,755,032 and 5,274,400), and lastly, a more effective wiping system (U.S. Pat. No. 5,786,830) to clean the puddles. In some instances, adding surfactants is not an option because of adverse effect of the surfactants on the print quality. Mechanical wiping and design changes are often inefficient and add considerable expense to the cost of the printer.

Accordingly, a need exists in the art for a means to produce ink compositions for ink-jet printers that control puddling and yet exhibit favorable interactions with the components of the pen structure and in particular with the intented print media (e.g. paper) to maintain large dot size and high image quality.

SUMMARY OF THE INVENTION

The invention is an ink-jet ink composition. The composition comprises at least one colorant and a vehicle. The vehicle includes at least one organo-phosphonic acid or sodium or potassium salt of the said acid (In the following text, when organo-phosphonic acid is cited, the acid and it salt are implied). The vehicle may contain mixtures of two or more organo-phosphonic acids. The organo-phosphonic acid may be monofunctional or polyfunctional. Preferably the organo-phosphonic acid is polyfunctional. The concentration of organo-phosphonic acid may be from about 0.05 to about 10 wt %. The organo-phosphonic acids may be of general formula

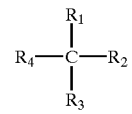

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$ is a phosphonic acid group. More preferably $R_2$ is a phosphonic acid group, $R_3$ is a methyl group, $R_4$ is a hydroxyl group and the organo-phosphonic acid is hydroxyethylene di(phosphonic acid) (HEDP).

The organo-phosphonic acids may be of general formula

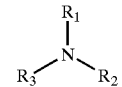

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$ is a methylene phosphonic acid group. More preferably $R_2$ and $R_3$ are methylene phosphonic acid groups and the organo-phosphonic acid is amino tri(methylene phosphonic acid) (ATMP).

The organo-phosphonic acids may be of general formula

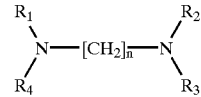

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof.

Preferably $R_2$, $R_3$ and $R_4$ are methylene phosphonic acid groups. Preferably n=2 and the organo-phosphonic acid is ethylene diamine tetra(methylene phosphonic acid) (EDTMP), or n=6 and the organo-phosphonic acid is hexamethylene diamine tetra(methylene phosphonic acid) (HDTMP).

The organo-phosphonic acids may be of general formula

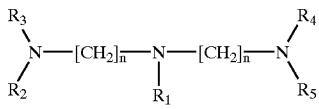

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. Preferably $R_2$, $R_3$, $R_4$ and $R_5$ are methylene phosphonic acid groups. Preferably n=2, and the organo-phosphonic acid is diethylene triamine penta(methylene phosphonic acid) (DTPMP).

The vehicle may further include from about 0 to about 10 wt % surfactants, and from about 0.1 to about 40 wt % organic cosolvents. The pH of the ink composition may be from about 2 to about 10.

DESCRIPTION OF CERTAIN PREFERRED EMBODIMENTS

The invention will now be described with particular reference to certain preferred embodiments of the ink-jet ink compositions of the invention.

Exemplary embodiments of the ink compositions comprise, by weight (all percentages are by weight unless otherwise indicated) from 0.1 to 40%, preferably from 5 to 25% organic cosolvent; from 0 to 10%, preferably from 0.1 to 5% surfactant; from 0.5 to 10%, preferably from 0.5 to 5% colorant; and from 0.05 to 20%, preferably from 0.1 to 10%, organo-phosphonic acid. The remainder of the ink compositions are mostly water; however, other components including biocides that inhibit growth of microorganisms such as the preservative PROXEL™ GXL (available from Avecia Incorporated); chelating agents such as EDTA that eliminate deleterious effects of heavy metal impurities; buffers; and viscosity modifiers, may be added to improve various properties of the ink composition.

Organic Cosolvents

One or more organic cosolvents may be used to prepare the ink compositions of the present invention. In a preferred embodiment, the organic cosolvents are water-soluble. Many of the water soluble organic cosolvents known for use in ink-jet printing may be employed in the practice of this invention. For the purposes of clarification only, and not for limitation, some exemplary water-soluble organic cosolvents suitable for this purpose are set forth below.

Exemplary water-soluble organic cosolvents include, but are not limited to, aliphatic alcohols, aromatic alcohols, diols, triols, amides, ketones, polyketones or ketoalcohols, nitrogen-containing heterocyclic ketones, ethers, glycol ethers, polyglycol ethers, alkylene glycols, polyalkylene glycols, thioglycols containing alkylene groups, lower alkyl ethers of polyhydric alcohols and lactams.

The concentration of the organic cosolvents may range from 0.1 to 40 wt %, preferably from 5 to 25 wt %.

Surfactants

One or more water-soluble surfactants may be employed in the formulation of a vehicle for the ink. Many of the water-soluble surfactants known for use in ink-jet printing may be employed in the practice of this invention. For the purposes of clarification only, and not for limitation, some exemplary water-soluble surfactants suitable for this purpose are set forth below.

For convenience, examples of surfactants are divided into two categories: (1) non-ionic and amphoteric and (2) ionic. The former class includes the TERGITOL™ and BRIJ™ families of alkyl polyethylene oxides (POEs), available from Union Carbide Corporation and the ICI Group, respectively; certain members of the ZONYL™ family of fluorosurfactants, available from DuPont Corporation; the FLUORAD™ family of fluorinated alkyl esters available from 3M Company; the TRITON™ family of alkyl phenyl POEs available from Union Carbide Corporation; the PLURONIC™ family of ethylene oxide/propylene oxide block copolymers available from BASF Corporation; the SURFYNOL™ family of acetylenic POEs available from Air Products Incorporated; POE esters; POE diesters; POE amines; and POE amides. U.S. Pat. No. 5,106,416 (incorporated by reference herein) discusses many of the surfactants listed above in greater detail. Amphoteric surfactants such as substituted amine oxides or members of the MACKAM™ family of octylamine choloroacetic adducts available from the McIntyre Group are also useful in the practice of this invention. Cationic surfactants such as protonated POE amines, and anionic surfactants such as members of the DOWFAX™ family of diphenyl sulfonate derivatives available from the Dow Chemical Company, and the CRODAFOS™ family of ethoxylated oleoalcohol phosphate esters available from Croda Incorporated, may also be used.

The ink composition of the present invention comprises by weight from 0 to 10%, preferably from 0 to 5%, surfactant.

Colorants

One or more colorants may be employed in the ink composition, typically dyes or pigments. The dye or pigments may be non-ionic, cationic, anionic, or mixtures thereof. Any of the color dyes or pigments known for use in ink-jet printing may be employed in the practice of this invention. For the purposes of clarification only, and not for limitation, some exemplary colorants suitable for this purpose are set forth below.

Suitable colorants for the present invention include but are not limited to aqueous dyes such as Reactive Red 180, Direct Blue 86, Direct Blue 199, Direct Yellow 132, Acid Yellow 132, Direct Red 9, Direct Red 32, Acid Yellow 23, Acid Blue 185, Acid Blue 9, Acid Red 17, Acid Red 52, and Acid Red 249.

Suitable colorants for the present invention include but are not limited to pigments such as the PALIOGEN™ and HELIOGEN™ pigment families available from BASF Corporation; the CHROMOPHTAL™ and MONASTRAL™ pigment families available from Ciba Specialty Chemicals Corporation; the TI-PURE™ family of titanium dioxide pigments available from DuPont Corporation; the MONARCH™ pigment family from Cabot Corporation; and the NOVOPERM™, HANSA™ and HOSTAPERM™ pigment families available from Clariant Corporation.

The ink composition of the present invention comprises by weight from 0.5 to 10%, preferably from 0.5 to 5% colorant.

Organo-Phosphonic Acids

One or more organo-phosphonic acids may be included in the ink composition of the present invention. The organo-phosphonic acid may be monofunctional or polyfunctional. Preferably the organo-phosphonic acid is polyfunctional. Examples of suitable organo-phosphonic acids include organo-phosphonic acids of general formula

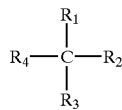

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a phosphonic acid group. In a preferred embodiment, $R_2$ is a phosphonic acid group, $R_3$ is a methyl group, $R_4$ is a hydroxyl group and the organo-phosphonic acid is hydroxyethylene di(phosphonic acid) (HEDP, available as DEQUEST™ 2010 from Solutia Incorporated or as BRIQUEST™ ADPA-60AW from Albright & Wilson Americas Incorporated).

Other examples of organo-phosphonic acids that may be used according to the present invention include organo-phosphonic acids of general formula

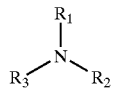

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In a preferred embodiment, $R_2$ and $R_3$ are methylene phosphonic acid groups and the organo-phosphonic acid is amino tri(methylene phosphonic acid) (ATMP, available as DEQUEST™ 2000LC from Solutia Incorporated or as BRIQUEST™ 301-50A from Albright & Wilson Americas Incorporated).

Yet other examples of organo-phosphonic acids that may be used according to the present invention include organo-phosphonic acids of general formula

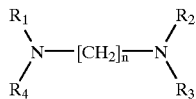

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In another embodiment, $R_2$ and $R_3$ are methylene phosphonic acid groups. In yet another embodiment, $R_2$, $R_3$ and $R_4$ are methylene phosphonic acid groups. In yet another preferred embodiment, n=6 and the organo-phosphonic acid is hexamethylene diamine tetra(methylene phosphonic acid) (HDTMP, available as DEQUEST™ 2054 from Solutia Incorporated, or as BRIQUEST™ 462-23 from Albright & Wilson Americas Incorporated).

Yet other examples of organo-phosphonic acids that may be used according to the present invention include organo-phosphonic acids of general formula

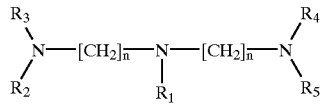

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group of alkyl groups, aryl groups, hydroxyl groups, phosphonic acid groups, ether groups, ester groups, and mixtures thereof. In one embodiment, $R_2$ is a methylene phosphonic acid group. In another embodiment, $R_2$ and $R_3$ are methylene phosphonic acid groups. In yet another embodiment, $R_2$, $R_3$ and $R_4$ are methylene phosphonic acid groups. In yet another embodiment, $R_2$, $R_3$, $R_4$ and $R_5$ are methylene phosphonic acid groups. In a preferred embodiment, n=2 and the organo-phosphonic acid is diethylene triamine penta(methylene phosphonic acid) (DTPMP, available as DEQUEST™ 2060S from Solutia Incorporated or as BRIQUEST™ 543-45AS from Albright & Wilson Americas Incorporated). The ink composition of the present invention comprises by weight from 0.1 to 20%, preferably from 0.5 to 10%, 2 to 10%, or 5 to 10% organo-phosphonic acid.

EXAMPLE

For the purposes of clarification only, and not for limitation, an exemplary ink composition of the present invention is set forth below in Table 1 (all values are weight percentages unless otherwise indicated).

TABLE 1

| Component | Ink 1 | Ink 2 |
|---|---|---|
| Alkyl Diols | 11.25 | 11.25 |
| EDTA sodium salt | 0.10 | 0.10 |
| Dequest 2054 | 0 | 1.0 |
| Buffer | 0.15 | 0.15 |
| dye | 1.3 | 1.3 |
| biocide | 0.2 | 0.2 |
| water | balance | balance |
| pH[1] | 7.5 | 7.5 |
| Number of plugged nozzles due to puddling After printing 6 pens and 6 diagnostic suites | 848 | 2 |

[1]The pH was adjusted by adding a sufficient amount of KOH.

Inks 1 and 2 both have the same composition except the additive:potassium salt of organo-phospshonic acid Dequest 2054.

The ability of polyphosphates and organic phosphonates to peptize, deflocculate and disperse particulates is well known and widely used. Small concentrations of these highly charged anions are strongly absorbed on surfaces. 1-hydroxyethylidene-1,1-phosphonic acid was claimed in a Japanese patent (JP 03193357) as an effective anti-clogging agent in tubings and in nozzles in a quiescent time of an inkjet printer. Without wishing to be bound to any particular theory, it is postulated that orgao-phosponates are adsorbed on the surface of the nozzles and orifice plate, thus preventing further accumulating of inks, which results in "puddling".

Conclusion

In Table 1 it was shown that the use of a salt of organo-phosphonic acid ink composition eliminates the plugging of print head nozzles. The ink composition of the invention is also designed to maximized print image quality. Organo-phosphonic acids are suitable agents for the ink composition of the invention. Organo-phosphonic acids are also known to be excellent chelating agents. Chelating agents form stable water-soluble complexes with metal ions, and thereby capture and hold unwanted metals in solution. In this context, organo-phosphonic acids are popular inhibitors of scale formation and corrosion. For example, HEDP and DTPMP are effective chelating agents in systems, which contain high levels of calcium and heavy metals respectively.

The benefits of the present invention are therefore highlighted when the puddling reduces and the known chelating properties of organo-phosphonic acids are combined. Other embodiments of the invention will be apparent to those skilled in the art from a consideration of the specification or practice of the invention disclosed herein. It is intended that the specification and examples be considered as exemplary only, with the true scope of the invention being indicated by the following claims.

What is claimed is:

1. An ink-jet ink composition, comprising at least one colorant and a vehicle, said vehicle including a salt of an organo-phosphonic acid of general formula

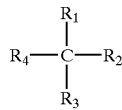

wherein $R_1$ and $R_2$ are phosphonic acid groups, and $R_3$ and $R_4$ can each, independently of each other, be hydrogen, a hydroxyl group, a phosphonic acid group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

2. The ink-jet ink composition of claim 1, wherein said salt of an organo-phosphonic acid is a salt of hydroxyethylene di(phosphonic acid).

3. The ink-jet ink composition of claim 1, wherein the concentration of said salt of an organo-phosphonic acid is in the range of about 0.05 wt % to about 20 wt %.

4. The ink-jet ink composition of claim 1, wherein the pH of the ink composition is between about 2 and about 10.

5. The ink-jet ink composition of claim 1, wherein the vehicle further comprises from 0 to about 10 wt % surfactant.

6. The ink-jet ink composition of claim 1, wherein the vehicle further comprises from about 0.1 to about 40 wt % organic cosolvent.

7. An ink-jet ink composition, comprising at least one colorant and a vehicle, said vehicle including a salt of an organo-phosphonic acid of general formula

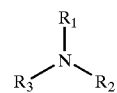

wherein $R_1$ is a methylene phosphonic acid group, and $R_2$ and $R_3$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

8. The ink-jet ink composition of claim 7, wherein said salt of an organo-phosphonic acid is a salt of amino tri (methylene phosphonic acid).

9. The ink-jet ink composition of claim 7, wherein the concentration of said salt of an organo-phosphonic acid is in the range of about 0.05 wt % to about 20 wt %.

10. The ink-jet ink composition of claim 7, wherein the pH of the ink composition is between about 2 and about 10.

11. The ink-jet ink composition of claim 7, wherein the vehicle further comprises from 0 to about 10 wt % surfactant.

12. The ink-jet ink composition of claim 7, wherein the vehicle further comprises from about 0.1 to about 40 wt % organic cosolvent.

13. An ink-jet ink composition, comprising at least one colorant and a vehicle, said vehicle including a salt of an organo-phosphonic acid of general formula

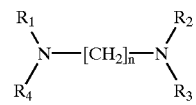

wherein n is an integer between 1 and 6, $R_1$ is a methylene phosphonic acid group, and $R_2$, $R_3$ and $R_4$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

14. The ink-jet ink composition of claim 13, wherein said salt of an organo-phosphonic acid is a salt of ethylene diamine tetra(methylene phosphonic acid).

15. The ink-jet ink composition of claim 13, wherein said salt of an organo-phosphonic acid is a salt of hexamethylene diamine tetra(methylene phosphonic acid).

16. The ink-jet ink composition of claim 13, wherein the concentration of said salt of an organo-phosphonic acid is in the range of about 0.05 wt % to about 20 wt %.

17. The ink-jet ink composition of claim 13, wherein the pH of the ink composition is between about 2 and about 10.

18. The ink-jet ink composition of claim 13, wherein the vehicle further comprises from 0 to about 10 wt % surfactant.

19. The ink-jet ink composition of claim 13, wherein the vehicle further comprises from about 0.1 to about 40 wt % organic cosolvent.

20. An ink-jet ink composition, comprising at least one colorant and a vehicle, said vehicle including a salt of an organo-phosphonic acid of general formula

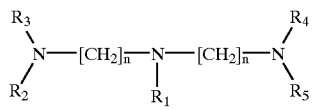

wherein n is an integer between 1 and 6, $R_1$ is a methylene phosphonic acid group, and $R_2$, $R_3$, $R_4$ and $R_5$ can each, independently of each other, be hydrogen, a hydroxyl group, an alkyl group, an aryl group, or a substituted alkyl or aryl group having substituents selected from the group consisting of alkyl groups, aryl groups, hydroxyl groups, phosphonic acid groups, ether groups, ester groups, and mixtures thereof.

21. The ink-jet ink composition of claim 20, wherein said salt of an organo-phosphonic acid is a salt of diethylene triamine penta(methylene phosphonic acid).

22. The ink-jet ink composition of claim 20, wherein the concentration of said salt of an organo-phosphonic acid is in the range of about 0.05 wt % to about 20 wt %.

23. The ink-jet ink composition of claim 20, wherein the pH of the ink composition is between about 2 and about 10.

24. The ink-jet ink composition of claim 20, wherein the vehicle further comprises from 0 to about 10 wt % surfactant.

25. The ink-jet ink composition of claim 20, wherein the vehicle further comprises from about 0.1 to about 40 wt % organic cosolvent.

26. The ink-jet ink composition of any one of claims 1, 2, 7, 8, 13, 14, 15, 20, or 21, wherein said salt of an organo-phosphonic acid is a sodium salt.

27. The ink-jet ink composition of any one of claims 1, 2, 7, 8, 13, 14, 15, 20, or 21, wherein said salt of an organo-phosphonic acid is a potassium salt.

* * * * *